United States Patent
Rahai et al.

(10) Patent No.: US 11,131,278 B2
(45) Date of Patent: Sep. 28, 2021

(54) SYSTEM AND METHOD FOR REDUCING NOX EMISSIONS OF CARGO HANDLING EQUIPMENT (CHE)

(71) Applicants: Hamid Rahai, Long Beach, CA (US); Jeremy Bonifacio, Huntington Beach, CA (US); Shahab Taherian, Los Angeles, CA (US)

(72) Inventors: Hamid Rahai, Long Beach, CA (US); Jeremy Bonifacio, Huntington Beach, CA (US); Shahab Taherian, Los Angeles, CA (US)

( * ) Notice: Subject to any disclaimer, the term of this patent is extended or adjusted under 35 U.S.C. 154(b) by 0 days.

(21) Appl. No.: 17/173,791

(22) Filed: Feb. 11, 2021

(65) Prior Publication Data
US 2021/0254586 A1  Aug. 19, 2021

Related U.S. Application Data

(60) Provisional application No. 62/975,984, filed on Feb. 13, 2020.

(51) Int. Cl.
| F02M 35/10 | (2006.01) |
| F01N 3/02 | (2006.01) |
| F02M 63/00 | (2006.01) |
| F02M 25/035 | (2006.01) |

(52) U.S. Cl.
CPC ..... *F02M 35/10393* (2013.01); *F01N 3/0205* (2013.01); *F02M 25/035* (2013.01); *F02M 63/0015* (2013.01)

(58) Field of Classification Search
CPC ......... F02M 35/10393; F02M 63/0015; F02M 25/035; F01N 3/0205
See application file for complete search history.

(56) References Cited

FOREIGN PATENT DOCUMENTS

CN    202348482 U  *  7/2012

* cited by examiner

*Primary Examiner* — Jacob M Amick
*Assistant Examiner* — Charles J Brauch
(74) *Attorney, Agent, or Firm* — Fulwider Patton LLP

(57) ABSTRACT

A humid air system (HAS) for reducing NOx emissions of an LPG-powered forklift and other heavy equipment is disclosed. A humid air system (HAS) uses distilled water and heat of exhaust to generate steam, injected at the intake air of the engine to increase humidity and reduce temperature and NOx emission. The system includes a pipe with a coiled-tube insert that is attached to the exhaust. A water pump connected to a solenoid valve supplies distilled water from a container to the exhaust coil, generating steam that is fed to a mixing box at the engine air intake in order to increase intake air humidity. A feedback control system controls the solenoid valve opening to adjust the water flow rate for maintaining humidity level between 90% to saturation.

5 Claims, 2 Drawing Sheets

SYSTEM AND METHOD FOR REDUCING NOX EMISSIONS OF CARGO HANDLING EQUIPMENT (CHE)

CROSS-REFERENCES TO RELATED APPLICATIONS

This application claims priority from U.S. Provisional Patent Application No. 62/975,984, filed Feb. 13, 2020, the content of which is incorporated by reference herein in its entirety.

BACKGROUND

Maritime industry-related equipment contributing to environmental emissions can be classified into five categories: ocean-going vessels (OGV), harbor crafts, locomotives, heavy duty vehicles, and cargo handling equipment (CHE). At the Port of Los Angeles, for example, the largest annual contribution of pollutants from nitrogen oxides ("NOx") emissions comes from the OGVs at over 3200 tons, followed by the heavy duty vehicles (1857 tons), locomotives (780 tons), harbor crafts (751 tons), and CHEs (435 tons). NOx is one of the main contributors to the formation of the ground-level ozone (smog), a major cause of respiratory illnesses in children, older adults, and people with lung diseases. These harmful gases are also a contributing factor in global warming. NOx reacts with other substances to form acid aerosols, leading to acid rain that is known to cause damage to vegetation and to contaminate rivers, impacting fish populations, and causing increased nitrogen loading in water. In addition, excess NOx changes the aqueous chemical balance of nutrients used by aquatic plant and animal life with adverse impacts. It also blocks transmission of light and thus impairs visibility. Ozone can be transported by wind, and its health impacts can reach far from its original source.

Sunlight driven chemical reactions in the lower part of the troposphere (below an elevation of ten kilometers) produce ground-level ozone and other photochemical oxidants. The reactions primarily involve volatile organic compounds (VOCs) as well as NOx. Ozone negatively impacts respiratory tracts, which in turn increases the incidence of asthmatic attacks and can contribute to the development of lung cancer. Ozone also damages crops (reducing yields), causing major economic losses. Ozone can be generated locally or regionally and can also be transported over very long distances. Reducing NOx reduces ground-level ozone, with increased economic and health impacts.

In California, ports' emission contributions in the south coast basin have been reduced significantly. For the Port of Los Angeles, the percentage of diesel particulate matter (DPM) has dropped from approximately 9% to below 5%, and the percentage of oxides of sulfur (SOx) has dropped from over 25% to less than 2.5%. However, there has not been significant overall reduction in NOx emissions, which have persisted at around 5%. The present invention is directed to solutions that can significantly reduce the NOx emissions caused by CHE operation.

SUMMARY OF THE INVENTION

The present invention is directed to a humid air system for bringing about a reduction in NOx emissions from CHEs' operation. The estimated contributions of CHE operation to the total annual NOx emissions is slightly higher than 6%. The CHE category surveyed at the Port of Los Angeles included 2202 pieces of equipment which included yard tractors (48%), forklifts (23%), top handlers (10%), RTG crane (5%), side pick (1%), and 13% "others" made up of man lift, excavators, rail pushers, sweepers, bulldozers, etc. The yard tractors' engines are 851 diesel, 17 LNG, and 180 propane, and the forklifts' engines are 118 diesel, 381 propane, 7 gasoline, and 8 electric.

The present invention uses a humid air system (HAS) to reduce diesel NOx emissions. In this method, water vapor is injected at the location of the intake air supplied to the engine cylinders. The water injection reduces the temperature in the cylinder and raises the specific heat of the air/fuel mixture, which also contributes to the elimination of the hot spots in the engine's cylinders. Since NOx production is a function of temperature, with the decrease in temperature a corresponding reduction in the NOx generated is achieved. With an optimized system, HAS systems can reduce NOx emission without significant increases in hydrocarbon emissions. Other benefits of this process include longer life of the engine components due to reduced cycle temperature and reductions in carbon deposits.

The present inventors investigated the effects of introducing humid air in the combustion process on the performance of a naturally-aspired three cylinder diesel engine with a low-sulfur diesel fuel. The addition of the humidified air to the intake air was performed with a variable steam generator using distilled water, where the relative humidity levels of the intake air were changed from the ambient conditions of 65% to 75% and 95% levels. The tests were performed at two approximate engine output break horse powers (BHP) of 5.9 and 8.9. Results showed approximately 3.7% and 22.5% reduction in NOx emissions when the relative humidity of the air was increased from 65% (the ambient relative humidity) to 75% and 95%, respectively. The addition of the humidity results in increases in the CO, CO2, and PM, by approximately 3.7%, 3.55%, and 14.9% at 5.9 BHP and 22%, 2.8%, and 9.3% at 8.9 BHP. There was no change in the brake specific fuel consumption (BSFC) at 5.9 BHP but there was an approximate 2.7% increase in the BSFC at 8.9 BHP. These results indicate that for both mobile and stationary diesel engines, the humid air system is a viable option for attaining significant reduction in NOx emissions.

The effect of a humid air system on NOx and particulate matter (PM) emissions of a compressed natural gas (CNG) engine and natural gas combustion have been evaluated. Results of a theoretical investigation of the natural gas combustion showed a NOx reduction of up to 80% with input air at 60% relative humidity (RH). For the experimental investigations, General Motors inline 4 cylinders, naturally aspirated engine with a maximum rated horsepower (HP) of 50.8 for natural gas fuel, was used. The engine was connected to a water-cycled dynamometer, and NOx emission was measured by a Horiba portable emission analyzer model 250 and exhaust PM was measured using a dilution tunnel in conjunction with a cyclone with teflo filters. The experiments were carried out at four different horsepower values of approximately 5, 12.5, 25, and 37.5, and three relative humidities (RH) of 30% (ambient), 45%, and 60%. Results showed for each additional 15% increase in relative humidity, there is nearly a 10% reduction in NOx emission.

The PM emissions increased with the addition of relative humidity, especially at low HPs. With increasing HP, the PM augmentation was reduced significantly, and at 37.5 HP, the ratios of PM emitted at 45% and 60% RH to the corresponding ambient baseline values (at 30% RH) were near 2.0.

In view of the foregoing, a primary objective of the present invention is to provide a humid air system for reducing NOx emission of a CNG-powered forklift or the like.

Adding humidity to the intake air of diesel engines reduces combustion temperature and NOx emissions, and also cleans the engine and improves its longevity.

The present invention includes a system to generate steam from distilled water using engine exhaust heat and applies it to a CNG-powered cargo handling equipment in order to reduce its NOx emissions. In one test, a Clark forklift, Model GM 3.0 LPG (liquid propane gas), was used for field testing. The laboratory test was performed on a PSI engine, Model GM 3.0, using compressed natural gas (CNG). The HAS includes an attachable exhaust pipe with coiled-tube insert that is used as a heat exchanger for generating steam, a pump with a solenoid valve for supplying distilled water to the coiled exhaust pipe, a mixing box for mixing intake air with steam. A feedback control system with temperature and humidity sensors was used for controlling supplied water and thus the amount of steam generated for increasing the humidity of the intake air. Results of both stationary engine and field tests indicate that maintaining the humidity of the intake air between 90% to saturation results in a significant reduction in NOx emissions. Both stationary engine tests and field testing indicate 2-3 ppm of NOx reduction per 1% increase in relative humidity.

DETAILED DESCRIPTION OF THE PREFERRED EMBODIMENTS

The present invention is directed to engines that power heavy equipment and vehicles such as forklifts, loaders, etc. that use natural gas as a fuel. Used herein, compressed natural gas ("CNG") engines shall refer broadly to an engine that uses CNG, liquid natural gas ("LNG"), methane, and similar fuels to power the engine.

Figure 1:
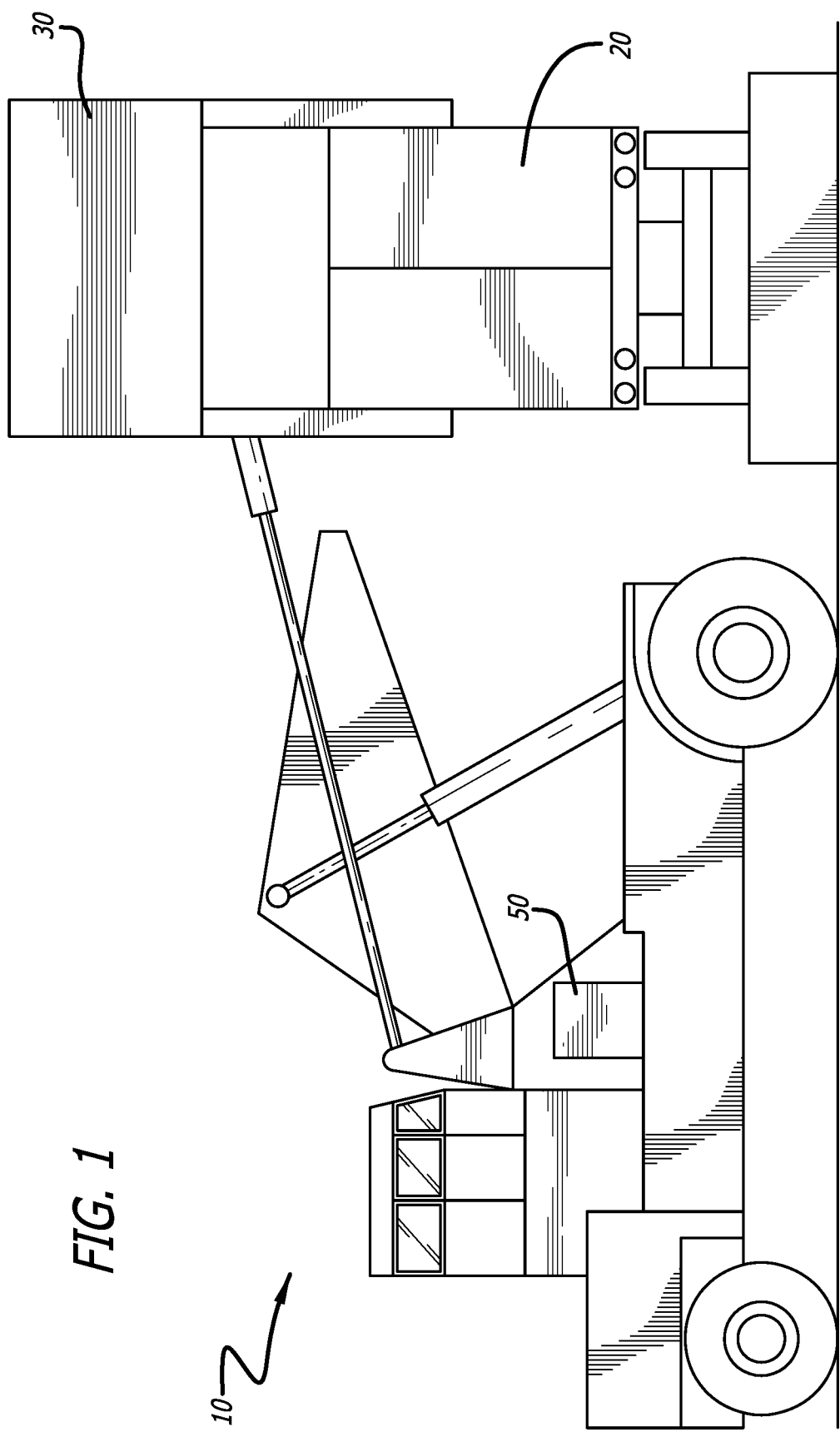
FIG. 1 is forklift apparatus for use with the present invention.

FIG. 1 illustrates a forklift 10 raising a container 20 using a crane 30 as is found in ports around the world. The forklift 10 may be equipped with the humidity air system 50 to work with the engine to reduce pollutants emitted by the forklift. Although a forklift is shown in FIG. 1, it is understood that the present invention works with a wide variety of heavy equipment within the five categories of equipment listed above and the invention is not limited to a particular type of heavy equipment or the like.

Figure 2:
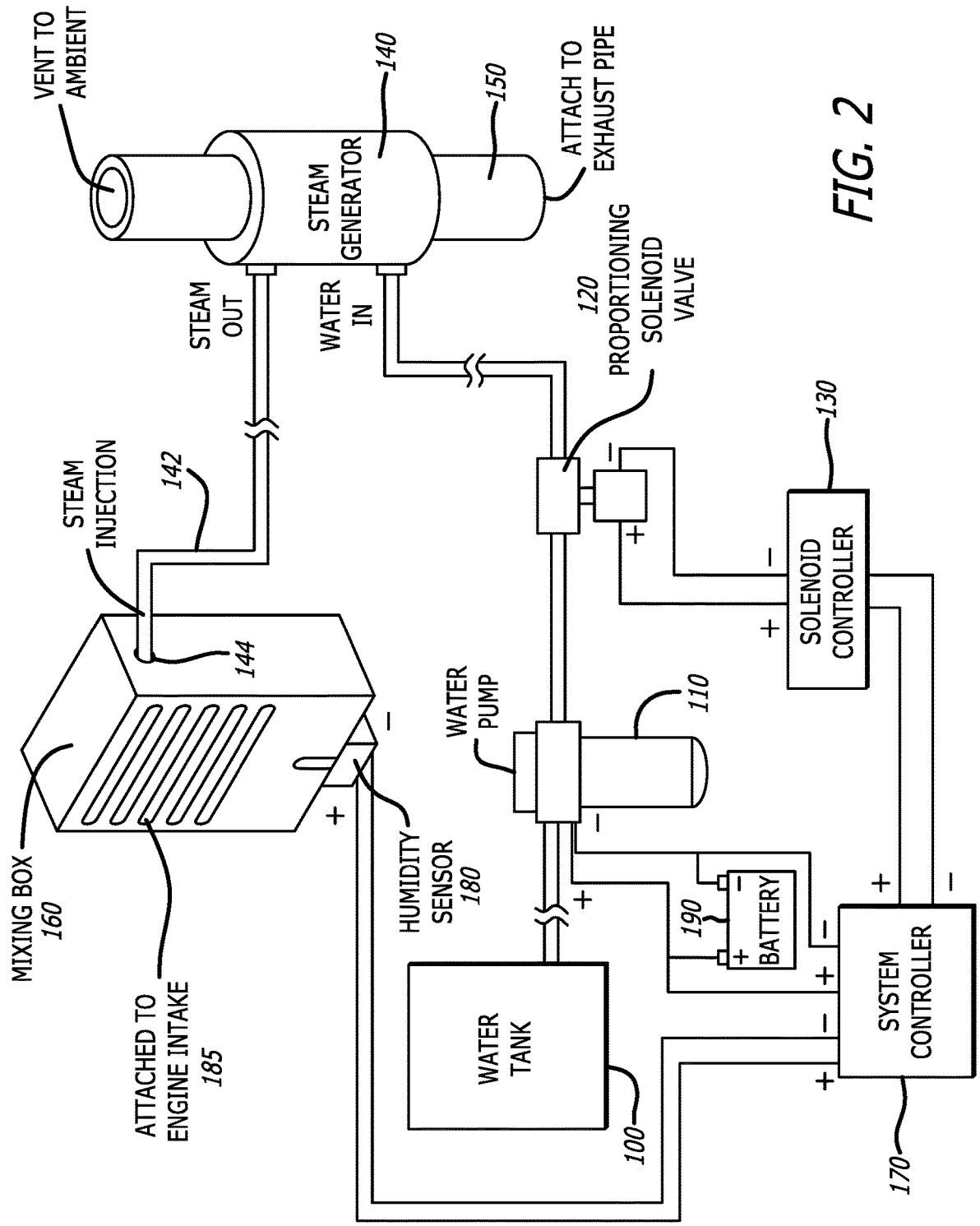
FIG. 2 is a schematic view of a first preferred embodiment of the present invention extension.

FIG. 2 illustrates a schematic of a humidified air system of the type employed by the present invention. A water tank 100 filled with water supplies the moisture for humidifying the combustion chamber of the engine (not shown). Water from the tank 100 is pumped via water pump 110 through a proportioning solenoid valve 120 that is managed by a solenoid controller 130. The flow through the valve 120 is fed to a steam generator 140 that is surrounds or in is proximity with a heat exchange 150. Steam exits the steam generator 140 and flows through conduit 142 to an injection port 144 of a mixing box 160. The mixing box 160 is moderated by the system controller 170 using a humidity sensor 180 to monitor and adjust the amount of humidity in the exiting air stream from the mixing box 160. The airflow exits vents 185 that are attached to the engine intake (not shown) such that carefully controlled humidified air is input directly into the engine's air intake valve. The system controller 170, powered by either the vehicle's battery or a stand-alone battery 190, controls both the mixing box air to vapor ratio and the proportional solenoid valve flow according to the conditions of the engine.

In one preferred embodiment of the present invention, the HAS includes the tubular coiled heat exchanger 150, placed at the outlet of the engine exhaust, a tank 100 of distilled water, a pump 110 that transfers the distilled water through a solenoid valve 120 into the heat exchanger 150 to generate steam from the exhaust heat, and delivers the steam into the intake mixing box 160 that increases the air intake humidity level. An iterative process is performed to identify the appropriate design and dimensions of the tubular coiled system to minimize exhaust blockage. A humidity sensor 180 is placed in the mixing box 160 to monitor and maintain the humidity level to near saturation, and a feedback control system (sensor 180, controller 170, solenoid valve 120) adjusts the flow of water into the heat exchanger 150 based on the humidity level in the mixing box 160.

The tests were conducted by lifting a cargo of steel brackets totaling 2185 lbs. and running at full throttle and load. The exhaust temperature exceeded the water boiling temperature and thus it was possible to have continuous steam flow for input to the mixing box to increase the humidity of the intake air to achieve NOx reduction. For NOx measurement, a portable Enerac micro emission analyzer, Model 500, was used. The unit is used to measure carbon monoxide (CO), nitric oxide (NO), nitrogen dioxide (NO2), sulfur dioxide (SO2), and oxygen from stationary and mobile engines. The range of measurement for these gases are:

OXYGEN Electrochemical cell. Life 2 years. Range: 0-25% by volume. Resolution: 0.1%. Accuracy: 0.2%.

NITRIC OXIDE (NO) Electrochemical cell. Life 2 years. Range: 0-2000 ppm. Resolution: 1 ppm. Accuracy: 4% of reading (±5 ppm when measuring less than 100 ppm).

NITROGEN DIOXIDE (NO2) Electrochemical cell. Life 2 years. Range: 0-1000 ppm. Resolution: 1 ppm. Accuracy: 4% of reading (±5 ppm when measuring less than 100 ppm).

CARBON MONOXIDE Electrochemical cell. Life 2 years. Range: 0-2000 ppm (optional ranges available: 10000 & 20000 ppm). Resolution: 1 ppm. Accuracy: 4% of reading (±5 ppm when measuring less than 100 ppm).

SULFUR DIOXIDE Electrochemical cell. Life 2 years. Range: 0-2000 ppm. Resolution: 1 ppm. Accuracy: 4% of reading (±5 ppm when measuring less than 100 ppm).

Table 1 shows the test results for the stationary engine. For all tests, the horsepower was maintained at nearly 50% of the rated power, namely, at 27. This was sufficient to test the engine with HAS; as for higher horsepower, engine vibration posed a significant problem in maintaining steady state operation. Results for the baseline and with steam generated from the fog machine showed a reduction in NOx by nearly 20% with increasing humidity by more than 42%. The NOx ppm dropped from 452 to 366, resulting in a ppm NOx reduction per percent humidity, ppm (NOx)/% Hum, of 2.02. When HAS was used, saturation conditions (100% humidity) were maintained during the test, and further reduction in NOx was obtained which resulted in ppm (NOX)/% Hum of 3.32. The corresponding values of ppm (NOx) per gram distilled water were 8.95 and 11.76, respectively. With added humidity, CO was increased by 23% and 29%, respectively, using the fog machine and HAS. The increases in CO per percent increase in humidity, ppm (CO)/% Hum, were 3.6 and 5.2, respectively.

TABLE 1

Stationary Engine Test Results

| Natural Gas Engine (50 HP Max) | Baseline | Fog Machine | HAS |
|---|---|---|---|
| Power (hp) | 27 | 27 | 27 |
| Humidity level (%) | 61.2 | 98.3 | 100 |
| Ambient humidity (%) | 61.2 | 55.9 | 63.9 |
| Ambient temperature (° F.) | 78.4 | 75.8 | 78.4 |
| Air flow rate (cfm) | 41 | 41 | 41 |
| NO$X$ (ppm) | 452 | 366 | 332 |
| CO (ppm) | 6.7 | 8.24 | 8.65 |
| Mass dry air (g/min) | 1395 | 1395 | 1395 |
| Mass humidity (g/min) | 0. | 9.6 | 10.2 |
| Mass fuel (g/min) | 132 | 132 | 132 |
| Humidity-Fuel mass ratio (%) | 0. | 7.3 | 7.7 |
| Ratio of NO$x$ to baseline | 1.0 | 0.81 | 0.73 |
| Ratio of CO to baseline | 1.0 | 1.23 | 1.29 |
| ΔNO$x$(ppm)/Δ % Humidity | N/A | 2.02 | 3.32 |

When HAS was used, while maintaining saturation at the engine air intake, there was condensation in the mixing box due to a drop in temperature, and thus the amount of water required to maintain saturation is reduced. However, the benefit of excess steam was that the engine could be supplied with saturated humid air continuously which resulted in a significantly higher NOx reduction at 27%.

Table 2 shows similar results for the field test for the engine load with full throttle. This condition is very similar to the stationary engine loading using a dynamometer. The horsepower is estimated from the power rating of the hydraulic pump used to load the engine while the forklift was stationary. Nearly a 70% reduction in NOx emissions is obtained with HAS at 90% relative humidity. The ppm (NOx)/% Hum is 2.2, which is close to the case of stationary engine with steam generated from the fog machine. With added humidity, the stack temperature dropped from 616° F. to 274° F., resulting in a 17% increase in CO. The ppm (CO)/% Hum is approximately 3.5, which is again close to the corresponding results with the fog machine on the stationary engine.

With liquid propane and the engine in operation, it is still possible to maintain an exhaust temperature above the boiling temperature of water in order to generate the necessary steam to reduce NOx emissions. However, it may be difficult at times to increase humidity and maintain saturation conditions. With added humidity and engine cool-down, it is expected that the humidity from the generated steam stays between 90% and 100%, maintaining a healthy NOx reduction.

TABLE 2

Field Test with Forklift

| Forklift Test (67 HP Max) | Baseline | HAS |
|---|---|---|
| Power (HP) | 30.8 | 30.8 |
| Humidity level (%) | 55.2 | 90 |
| Ambient humidity (%) | 55.2 | 55.2 |
| Ambient temperature (° F.) | 69.8 | 69.8 |
| Stack temperature (° F.) | 616 | 274 |
| Air flow rate (cfm) | 63 | 63 |
| NOX (ppm) | 117 | 40 |
| CO (ppm) | 58 | 68 |
| Mass dry air (g/min) | 2140 | 2140 |
| Mass humidity (g/min) | 0. | 22 |
| Mass fuel (g/min) | 203 | 203 |
| Humidity-Fuel mass ratio (%) | 0. | 10.8 |
| Ratio of NO$x$ to baseline | 1.0 | 0.34 |
| Ratio of CO to baseline | 1.0 | 1.17 |
| ΔNO$x$(ppm)/Δ % Humidity | N/A | 2.2 |

These results indicate that, with the addition of steam, the heat capacity of the intake air is increased, resulting in reduced combustion temperature.

Assuming an average of 60% efficiency in reducing NOx emission for the developed HAS, nearly 10 tons of NOx reduction would be realized annually at POLA with their annual inventory of air emissions and by incorporating HAS into existing propane-powered forklifts. The system could also be incorporated into diesel, propane, and LNG powered CHE, which could result in significant increases in annual NOx reduction.

These results provide a baseline parameter, /% NOx reduction per % increase in humidity, which allows the system to be scalable for applications to larger CNG and LNG engines, especially when freight transport is considered. The system is also adaptable to existing vehicles as well as incorporable into design of new engines. With the adaptation of this system to both gas and diesel-powered engines, significant reductions in NOx emissions will be obtained, resulting in improved air quality, health, and the economy.

While the general features and benefits of the present invention have been described and depicted herein, it is to be understood that the scope of the present invention extends beyond those depictions and descriptions herein. A person of ordinary skill in the art would readily recognize and appreciate a number of modifications and substitution to the descriptions herein, and the scope of the invention is intended to include all such modifications and substitutions. Accordingly, unless expressly stated herein, no specific embodiment herein shall be deemed exclusive to the scope of the present invention.

We claim:

1. A system for reducing NOx pollutants in a compressed natural gas (CNG) engine, comprising:
   a water tank;
   a water pump in communication with the water tank;
   a proportioning solenoid valve controlled by a solenoid controller for adjusting a flow of water delivered by the water pump;
   a heat exchanger adapted to exchange heat with said GNG engine's exhaust pipe;
   a steam generator in communication with the proportioning solenoid valve and adapted to receive heat from the heat exchanger to generate steam from the flow of water;
   a mixing box in communication with the steam generator for receiving the steam, the mixing box including a vent for delivering humidified air to the CNG engine's air intake; and
   a feedback loop for evaluating a humidity of the humidified air and adjusting the proportioning solenoid valve based on signals from a humidity sensor at the mixing box.

2. The system of claim 1, wherein the CNG engine is a component of a vehicle.

3. The system of claim 1, wherein the system reduces NOx emissions by twenty percent (20%).

4. The system of claim 1, wherein the feedback loop produces saturated air at the CNG engine's air intake.

5. The system of claim 1, wherein the feedback loop produces air at the CNG engine's air intake of between 90% and 100% saturation.

* * * * *